(12) United States Patent
Adams et al.

(10) Patent No.: US 6,269,900 B1
(45) Date of Patent: Aug. 7, 2001

(54) FRONT-END STRUCTURE FOR A MOTOR VEHICLE

(75) Inventors: Frank Adams, Herrenberg; Eberhard Benz, Gaertringen; Joachim Herre, Stuttgart; Josef Sailer, Haigerloch; Alfred Schnabel, Althengstett, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/384,986

(22) Filed: Aug. 30, 1999

(30) Foreign Application Priority Data

Aug. 29, 1998 (DE) .............................. 198 39 521

(51) Int. Cl.$^7$ ...................................... B60T 7/22
(52) U.S. Cl. ................... 180/274; 280/784; 296/189; 74/512
(58) Field of Search ................. 280/784; 180/274, 180/275; 296/189; 74/512

(56) References Cited

U.S. PATENT DOCUMENTS

| | | | |
|---|---|---|---|
| 4,022,081 | * 5/1977 | Dodd et al. | 74/512 |
| 5,372,216 | * 12/1994 | Tsuji et al. | 180/274 |
| 5,848,558 | * 12/1998 | Isono et al. | 74/512 |
| 5,848,662 | * 12/1998 | Sakaue | 180/274 |
| 5,915,494 | * 6/1999 | Matsumura et al. | 180/297 |
| 6,041,674 | * 3/2000 | Kato | 180/274 |

FOREIGN PATENT DOCUMENTS

| | | | |
|---|---|---|---|
| 2841988C2 | 4/1980 | (DE) . | |
| 3018732C2 | 11/1981 | (DE) . | |
| 4415642A1 | 12/1994 | (DE) . | |
| 19601800A1 | 8/1996 | (DE) . | |
| 19757832A1 | 7/1998 | (DE) . | |
| 58-28070 | 8/1956 | (JP) . | |
| 63-258259 | * 10/1988 | (JP) | 280/784 |
| 10-338167 | 12/1998 | (JP) . | |

\* cited by examiner

Primary Examiner—Kenneth R. Rice
Assistant Examiner—Lynda Jasmin
(74) Attorney, Agent, or Firm—Crowell & Moring, L.L.P.

(57) ABSTRACT

A front-end structure for a passenger motor vehicle has a front end region, in the direction of travel, of the brake servo unit which is assigned at least one mechanical forced guidance apparatus. The latter is fixed on at least one body-shell part. In a vehicle impact, the apparatus engages with at least one movement component in the vertical direction of the vehicle, from bottom to top, on the end region of the brake servo unit.

6 Claims, 4 Drawing Sheets

FRONT-END STRUCTURE FOR A MOTOR VEHICLE

BACKGROUND OF THE INVENTION

This application claims the priority of 198 39 521.3-42, filed Aug. 29, 1998, the disclosure of which is expressly incorporated by reference herein.

The present invention relates to a front-end structure for a motor vehicle, having a front wall which separates a passenger compartment from a front-end compartment and on which a brake servo unit is fixed, to which is connected a brake pedal extending into a footwell of the passenger compartment. The structure also has front-end body-shell parts and apparatus for pivoting the brake pedal and the brake servo unit forwards in the direction of travel in the event of a vehicle impact.

DE 44 15 642 A1 describes a front wall of a front-end structure of a motor vehicle which separates a passenger compartment from a front-end space. Arranged on the front wall, at the height of a bearing block for a pedal arrangement, is a brake servo unit, with the bearing block projecting into a footwell of the passenger compartment. The front wall is provided with a pre-planned bending region which is so arranged, relative to the bearing block for the pedal arrangement and relative to the brake servo unit, that in the event of a frontal impact and a corresponding deformation of the front wall, a pivoting movement of the bearing block is achieved. This results in a forward movement of the pedal arrangement, forwards in the direction of travel and thus out of the footwell towards the front wall. At the same time, the brake servo unit itself also follows the pivot movement.

DE 196 01 800 A1 describes a safety device for a pedal arrangement which is fixed by a bearing block to a front wall of a motor vehicle. Within the passenger compartment, a crossmember is arranged in front of the bearing block at a defined distance from the front wall and extends at the height of the articulation point of the pedal arrangement. This crossmember holds the pedal arrangement at a distance from the driver of the motor vehicle in the event of a front wall intrusion.

DE 197 57 832 A1 has a pedal arrangement on a front wall of a motor vehicle. The mounting of the pedal arrangement is provided with a stop surface which interacts with a corresponding stop on a cockpit crossmember. In the event of a frontal impact and a corresponding front wall intrusion, this combination generates a vertical upward movement of the pedal arrangement, so that the pedal arrangement is partially moved out from the remaining footwell of the passenger compartment.

A front-end structure for a motor vehicle described in DE 28 41 988 C2. The front-end structure forms part of a self-supporting bodyshell of a passenger vehicle. In order to prevent injury in the region of a driver's feet caused by the brake pedal arrangement in the event of a vehicle impact and a front-end deformation resulting therefrom, the brake pedal is moved forwards in the longitudinal direction of the vehicle, out of the footwell, by a pivoting of the associated brake servo unit in the event of a corresponding front-end deformation. To this end, the brake servo unit supporting the brake pedal is mounted by an independent support part, with the support part extending between a front-end side member and a windscreen crossmember. The brake servo unit is fixed on the support part so that both the brake booster and the brake master cylinder are arranged in front of this support part in the direction of travel.

Another front-end structure for a passenger vehicle is described in DE 30 18 732 C2, in which a brake servo unit is similarly mounted on a support part which is connected to a front wall of the body shell.

SUMMARY OF THE INVENTION

An object of the present invention is to provide a front-end structure in which the risk of injury to a driver of a motor vehicle in the foot region in the event of a vehicle impact can be reduced by a simple construction.

This object has been achieved in that a front end region, in the direction of travel, of the brake servo unit is assigned at least one mechanical forced guidance device, which is fixed on at least one body-shell part. In a vehicle impact, the device engages with at least one movement component in the vertical direction of the vehicle, from bottom to top, on the end region of the brake servo unit, which generates a tilting movement of the brake servo unit. Preferably, the tilting movement takes place about an axis of rotation extending transversely to the direction of travel in the region of the front wall.

As a result of the solution according to the invention, by contrast with known structures, no additional support part is needed to fix the brake servo unit to the front wall. The brake servo unit according to the invention remains, instead, in its customary fixing position on the front wall and merely bears the additional load of the forced guidance means in the front end region, preferably in the region of a brake master cylinder.

As a result of the fact that the forced guidance device engages in the front end region of the brake servo unit, the brake servo unit participates from an early stage in a deformation of the front-end structure, with a corresponding tilting movement. The invention is based on the recognition that corresponding body-shell parts of the front-end structure, especially an upper flange of the front-end side member on the driver's side and a suspension strut bracket on the driver's side also experience, in addition to a rearward deformation movement, an upward deformation component in the vertical direction of the vehicle.

The solution according to the invention benefits from this recognition in that the front end region of the brake servo unit, especially a housing of the brake master cylinder, is coupled by the at least one mechanical forced guidance device to this movement component in the vertical direction of the vehicle by positive fitting. As a result of the early participation in the front-end deformation, the brake servo unit can move back through a relatively wide pivot angle, so that reliable pivoting of the brake pedal forwards out of the footwell is achieved.

In an embodiment of the invention, the at least one forced guidance device is assigned to the end region of the brake servo unit. Thereby, in a backward displacement in the longitudinal direction of the vehicle during the impact deformation, it is uncoupled from the brake servo unit. This prevents a corresponding movement component by the body-shell parts undergoing deformation rearwards in the longitudinal direction of the vehicle from causing a further backward displacement of the brake pedal into the footwell. Because the forced guidance device is uncoupled during a backward displacement, it cannot cause any backward displacement of the brake servo unit. A corresponding backward displacement of the brake servo unit is thereby effectively avoided.

In a further embodiment of the invention, a supporting arm is arranged on the body-shell part as a forced guidance device and, during a front-end deformation, presses at least intermittently with positive fitting against an engagement point of the brake servo unit. This is a particularly simple and nevertheless effective embodiment. The engagement point may be provided on a housing of the brake master cylinder or on another part of the brake servo unit, especially on the brake booster.

In a further embodiment of the invention, the engagement point is formed by a supporting member on the housing of the brake master cylinder, which is positioned on the housing. Consequently, a movement component of the front-end deformation in the longitudinal direction of the vehicle, the supporting arm slides down backwards on the supporting member without applying a corresponding torque to the brake servo unit. As a result of the simple construction, the brake pedal is prevented from being pivoted back into the footwell as a result of compression of the front-end structure in the longitudinal direction of the vehicle, and a backward displacement of the brake servo unit is avoided.

In a further embodiment of the invention the supporting arm is provided with a pre-planned bending point preventing a torque on the brake servo unit contrary in or opposition to the tilting movement generated. The provision of a pre-planned bending point makes it possible to connect the supporting arm permanently to the engagement point on the housing of the brake master cylinder. This possibility exists because, notwithstanding the maintained connection between body-shell part and brake master cylinder as a result of the supporting arm, the supporting arm, can no longer transmit any forces to the brake servo unit in a front-end deformation in the longitudinal direction of the vehicle because of the correspondingly designed pre-planned bending point, which would cause a backward movement of the brake servo unit. Thus, the backward movement of the brake servo unit is desirably prevented.

In a further embodiment of the invention, the supporting arm is articulated on the engagement point by an uncoupling mechanism which effects a release of the supporting arm from the engagement point in the event of the initiation of a torque on the brake servo unit contrary to the tilting movement generated. Also as a result of this embodiment, the undesirable backward displacement of the brake pedal in the event of a corresponding front-end deformation is prevented. The uncoupling mechanism forms a releasable mounting of the supporting arm on the end region of the brake servo unit and hence on the housing of the brake master cylinder which follows the twisting movements and displacements of the brake servo unit. It preferably releases itself by unlatching from the brake servo unit as soon as the associated body-shell part is displaced rearwards in the longitudinal direction of the vehicle, which would bring about an undesirable backward movement of the brake pedal into the footwell.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
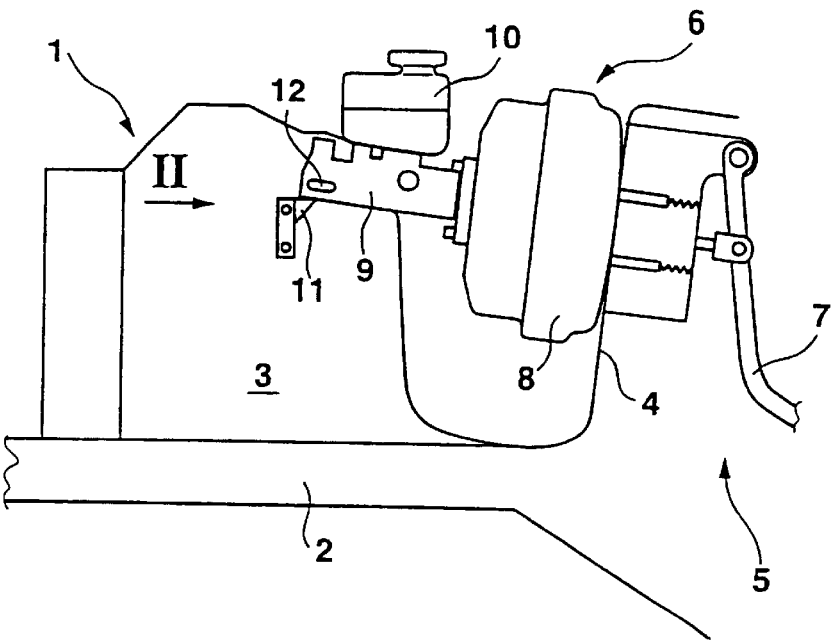
FIG. 1 is a schematic side view of a first embodiment of a front-end structure according to the invention for a passenger vehicle.
Figure 2:
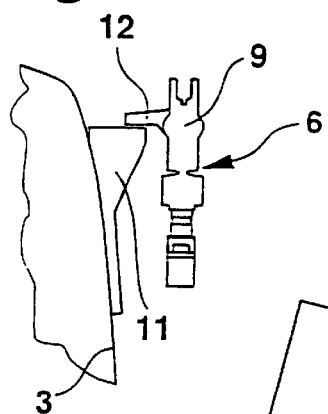
FIG. 2 is a view of a section of the front-end structure shown in FIG. 1 along the direction of the arrow II.

A passenger vehicle has, in a manner generally known in principle, a front-end structure designated generally by numeral 1 which is partially shown in FIG. 1 and which has as body-shell parts, among other items, two front-end side members 2 and, for each side of the vehicle, one suspension strut bracket 3 or one wheel installation. The front-end side members 2 make a transition into a front wall 4 which forms the end of the front-end structure 1 on the side of the passenger compartment and the vehicle interior. A brake pedal 7 projects in a manner generally known in principle into a footwell 5 of the vehicle interior and is coupled to a brake servo unit 6. The brake servo unit 6 is fixed on the front wall 4. The front-end structure 1 defines a front-end space, which represents an engine compartment in front-engined vehicles and a luggage or cargo compartment in rear-engined or mid-engined vehicles.

The brake servo unit 6 is fixed to the front wall 4 such that a brake booster 8 is located on the side of the front wall 4 facing the front-end space, in other words the engine compartment or the luggage or cargo compartment. Forward of the brake booster 8 in the longitudinal direction of the vehicle, it is adjoined by a brake master cylinder 9 which is likewise part of the brake servo unit 6. A brake fluid reservoir 10 may be arranged in a manner known per se above the brake master cylinder 9.

In a front end region of the brake servo unit 6, at a front end region of the brake master cylinder 9 in the embodiment shown, a laterally outward projecting supporting projection 12 serving as an engagement point is fixed on a housing of the brake master cylinder 9 and may be integrally molded onto the housing or rigidly connected thereto. The supporting projection 12 serving as a supporting member may be arranged at a slight angle relative to the horizontal front-end side member 2. The supporting projection 12 is assigned a supporting bracket 11 as a supporting arm which is fixed to the suspension strut bracket 3.

In the embodiment shown, the passenger vehicle has a right-hand drive. However, the front-end structure according to the invention can also be used in the same manner for a left-hand drive vehicle. In this case, the corresponding components of the invention are then assigned to the left-hand front-end side member (viewed in the direction of travel) and/or to the left-hand suspension strut bracket or an equivalent other body-shell part.

Figure 3:
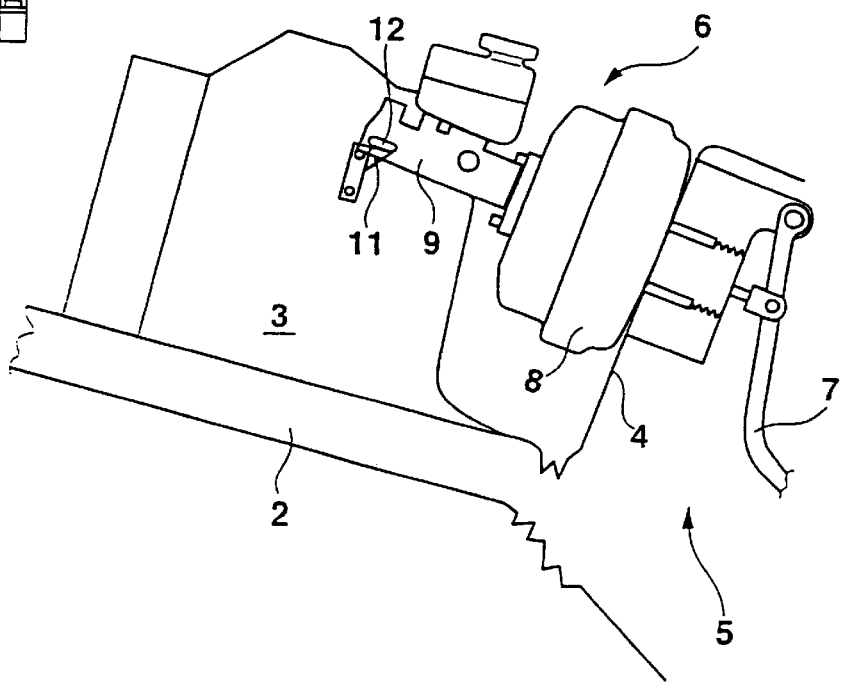
FIG. 3 is a view of the front-end structure of FIG. 1 in an instantaneous position during a front-end deformation caused by a vehicle impact.

The supporting bracket 11 is kept at a distance from the supporting projection 12. In a vehicle impact, the front-end structure 1 is deformed so that the front-end side member 2 and suspension strut bracket 3 move rearwards, on one hand, with a horizontal movement component in the longitudinal direction of the vehicle. On the other hand, the front-end structure 1, especially the front-end side member 2 and the suspension strut bracket 3, may undergo a movement component in the vertical direction of the vehicle (FIG. 3). As a result, the supporting bracket 11 comes to bear on the supporting projection 12 and, in the event of further deformation, presses the supporting projection 12 upwards.

Figure 4:
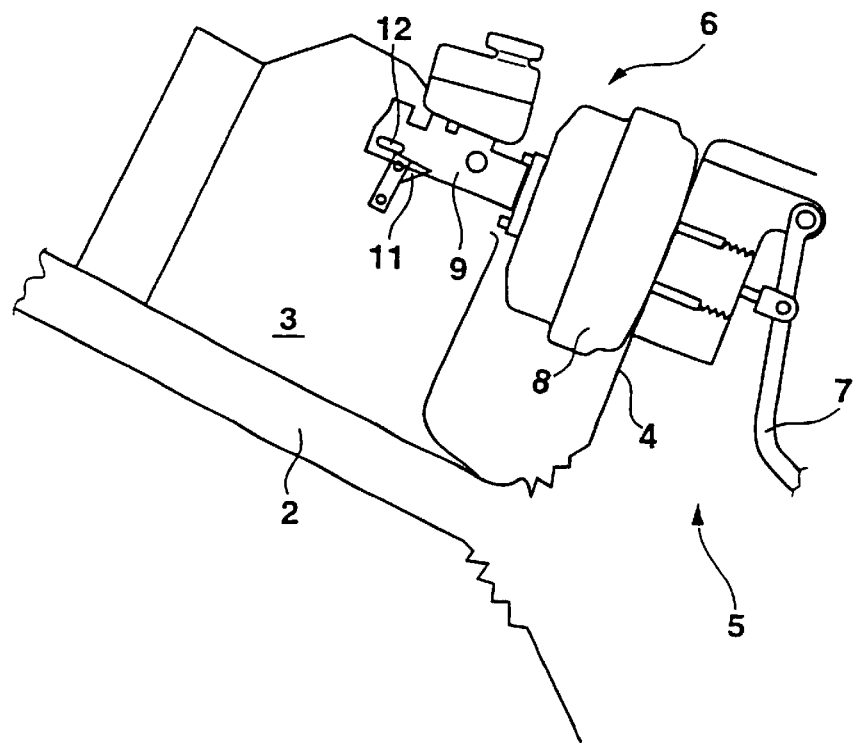
FIG. 4 is a view of the end position of the front-end structure of FIGS. 1 and 3 after front-end deformation has taken place.

The action of the supporting bracket 11 is strengthened thereby. Because the supporting projection 12 is rigidly connected to the housing of the brake master cylinder 9, the entire brake servo unit 6 is also pressed upwards at the same time with deformation of the section fixing it to the front wall 4, about the fixing point on the front wall 4. The brake servo unit 6 thus undergoes a tilting movement. The tilting movement takes place clockwise according to the illustration in FIGS. 1, 3 and 4. As a result of this tilting movement of the brake servo unit 6, the brake pedal 7 coupled to the brake servo unit 6 is moved forwards in the direction of travel out of the footwell 5, so that risks of injury in the region of the driver's feet are reduced.

To prevent further compression of the front-end structure in the longitudinal direction of the vehicle during front-end deformation in the course of a vehicle impact resulting in the brake servo unit 6, including the brake pedal 7, being displaced rearwards towards the footwell 5, the supporting bracket 11 slides down, from a particular pivot angle of the brake servo unit 6 relative to the front wall 4, on the supporting projection 12 and no longer exerts any further torque on the brake servo unit 6. This ensures that the desired, backward-pivoted position of the brake pedal 7 is retained and the brake servo unit 6 undergoes no further backward displacement as a result of further deformation of the front-end region in the region of the front-end side member 2 and the suspension strut brackets 3.

Figure 5:
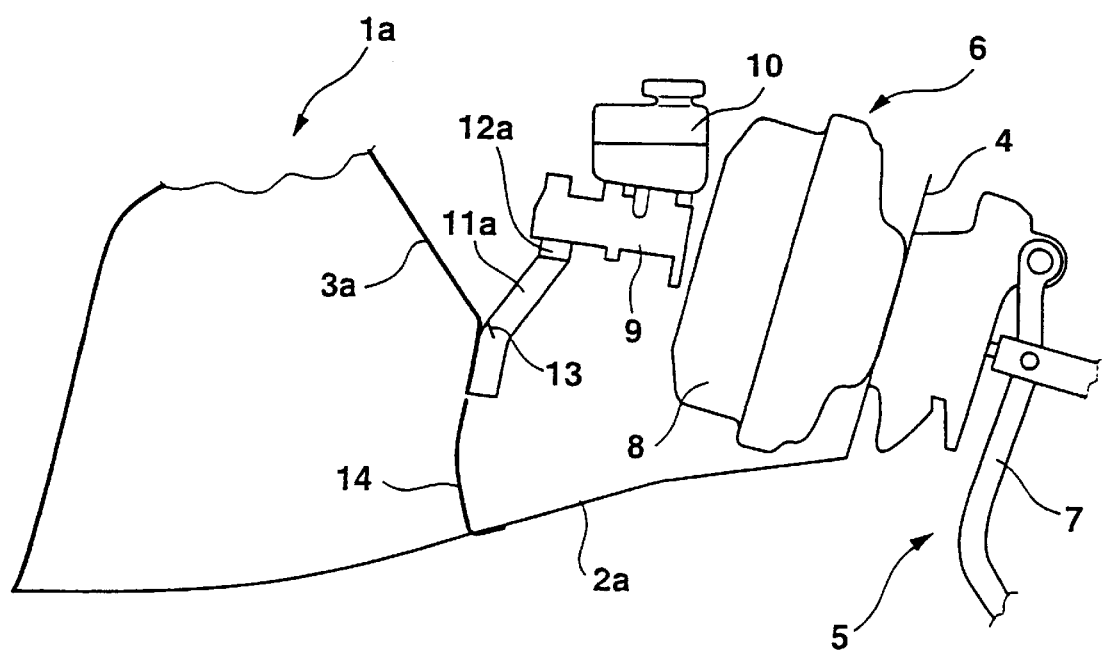
FIG. 5 is a schematic side view of a further embodiment of a front-end structure according to the invention.
Figure 6:
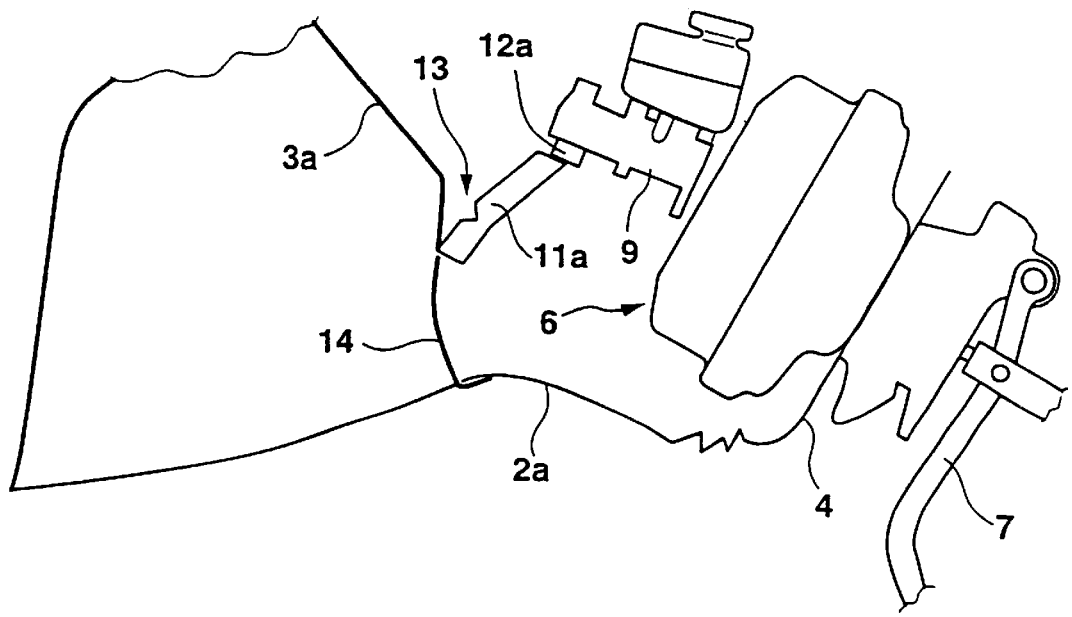
FIG. 6 is a view of the front-end structure of FIG. 5 in a partially deformed instantaneous position.
Figure 7:
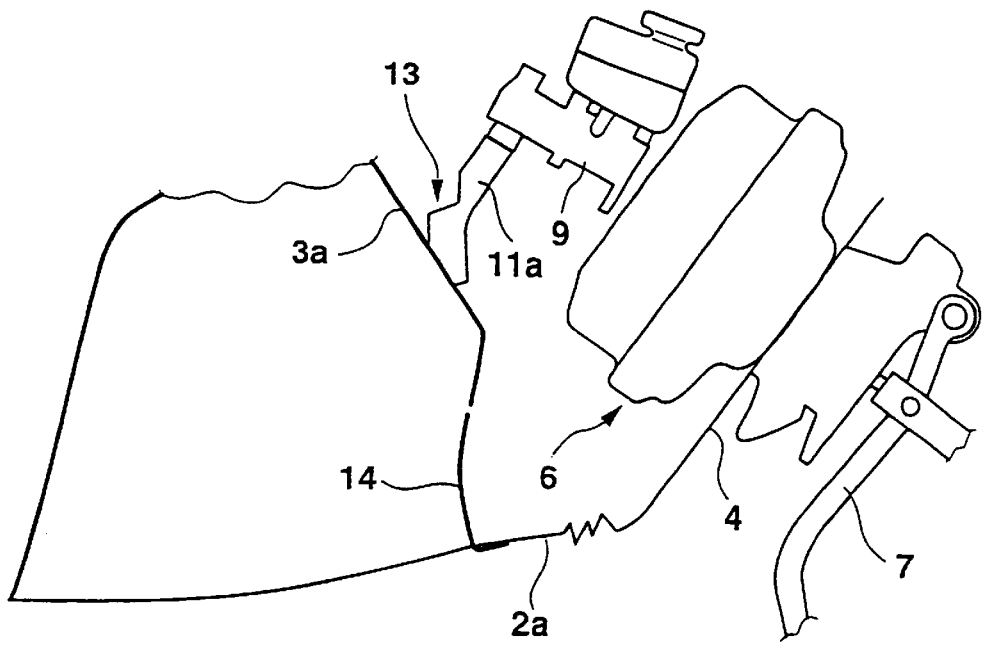
FIG. 7 is a view of the front-end structure of FIGS. 5 and 6 in a deformed end position thereof.

A front-end structure 1a according to FIGS. 5 to 7 is configured similarly to the front-end structure 1 according to FIGS. 1 to 4. The front-end structure 1a likewise has a front wall 4 on which a brake servo unit 6 is fixed in a manner corresponding to the embodiment of FIGS. 1 to 4. The configuration of the brake servo unit 6 and the arrangement of a brake pedal 7 in the footwell 5 correspond to the embodiment described above, so that reference is made to the description of the previous example of embodiment for a more detailed explanation. As a forced guidance structure, in order to tilt the brake servo unit 6 upwards relative to the front wall 4 and thereby effect a forward displacement of the brake pedal 7, a supporting arm 11a is provided in the embodiment shown in FIGS. 5 to 7 and is fixed to a rearward end region of a suspension strut bracket 3a.

A supporting flange 14 is fixedly connected to an upper flange of the front-end side member 2a. In the same manner, the supporting flange can also be connected to the wheel installation. The supporting arm 11a is fixed at its upper end to a supporting bearing 12a of the brake servo unit 6 which serves as an engagement point for the supporting arm 11a and is fixed on the housing of the brake master cylinder 9. The connection between the supporting bearing 12a and the supporting arm 11a, which is, in particular, a screw connection or as a mechanical connection of another form, is maintained throughout the entire deformation process resulting from a vehicle impact. The connection between the supporting bearing 12a and the supporting arm 11a can exhibit a degree of flexibility, as shown in FIG. 6.

The supporting arm 11a is provided with a pre-planned bending point 13 which is produced in the supporting arm 11a, especially as a slot. Thereby, when deformation of the front-end structure 1a begins, together with a resulting compressive stress on the supporting arm 11a in the vertical direction of the vehicle, upwards against the supporting bearing 12a, it is subjected only to compressive stress. In the event of a further deformation as shown in FIGS. 6 and 7, the supporting bearing 12a is displaced relative to the suspension strut bracket 3a so that the supporting arm 11a is also subjected to flexural stress and the pre-planned bending point 13 thus spreads open. The preplanned bending point 13 is so configured that a further deformation, especially in the longitudinal direction of the vehicle towards the rear, no longer transmits any horizontal movement component rearwards in the longitudinal direction of the vehicle to the brake servo unit 6, because the bending of the supporting arm 11a caused by the pre-planned bending point 13 absorbs corresponding movement components. An undesirable further backward displacement of the brake servo unit 6 is thus avoided, so that the brake pedal 7 remains in its position adopted as a result of the initial tilting movement of the brake servo unit 6 within the footwell 5.

Figure 8:
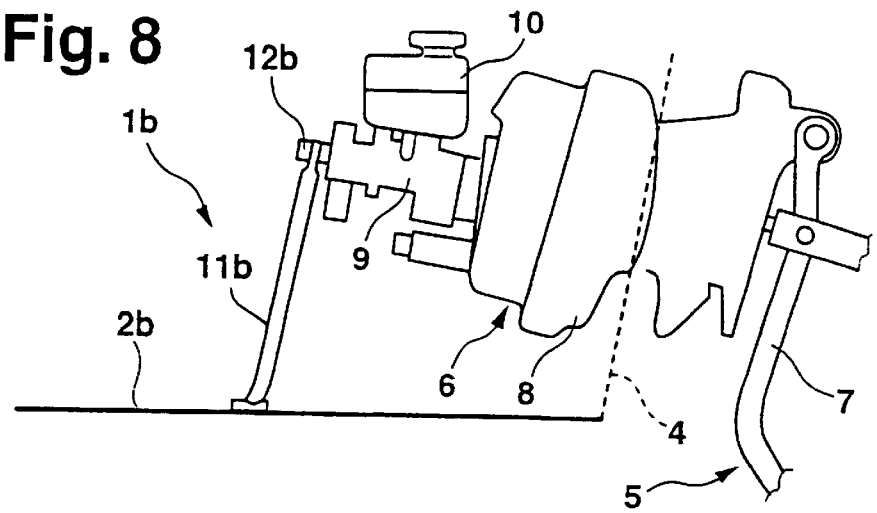
FIG. 8 is a schematic side view of a section of a further embodiment of a front-end structure according to the present invention.
Figure 9:
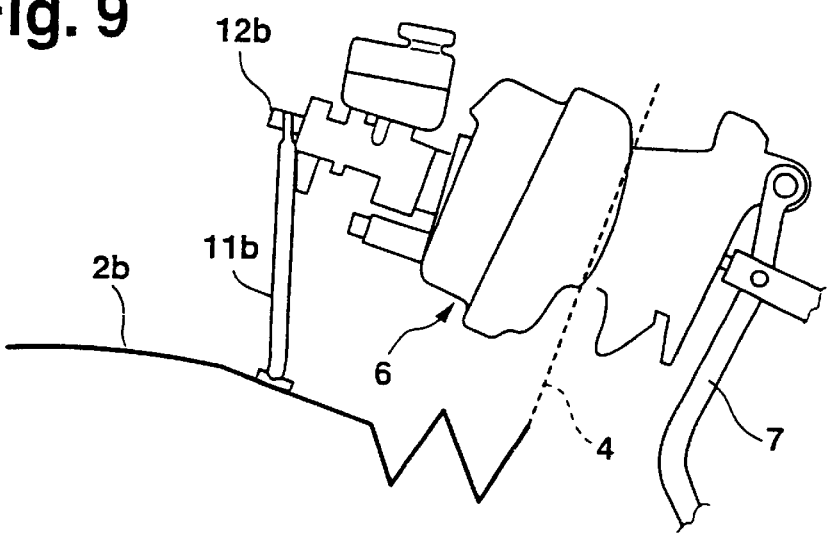
FIG. 9 is a view of the front-end structure according to FIG. 8 in a partially deformed instantaneous position.
Figure 10:
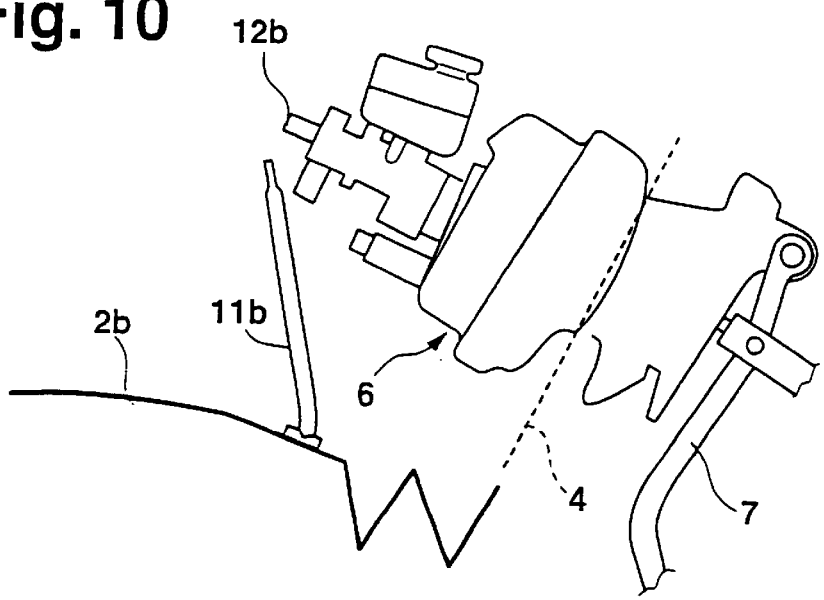
FIG. 10 is a view of the front-end structure of FIGS. 8 and 9 in a deformed end position.

The front-end structure 1b according to FIGS. 8 to 10 likewise has a front wall 4 on which a brake servo unit 6 is fixed in a manner corresponding to the preceding embodiments. Accordingly, parts of the front-end structure 1b with similar constructions and functions are provided with reference numerals identical to those in the previous examples of embodiment, so that more detailed explanation of these can be dispensed with.

The brake servo unit 6 is also linked by a forced guidance structure to a deformation of the front-end structure 1b, so that a deformation of the front-end structure results in an upward pivoting movement of the brake servo unit 6. To this end, a supporting arm in the form of an articulated pillar 11b is provided as a forced guidance device and is fixed by its lower end to an upper flange of the front-end side member 2b. By its upper end it is fixed to a compound bearing 12b serving as an engagement point and fixed to a front end, viewed in the direction of travel, of the housing of the brake master cylinder 9. The compound bearing 12 allows tilting and sliding movements between the brake servo unit 6 and the articulated pillar 11b.

In a deformation of the upper flange of the front-end side member 2b according to FIGS. 9 and 10, the articulated pillar 11b, which is rigid between the ends, is set upright because of the movement component of the deformation of the upper flange in the longitudinal direction of the vehicle. As a result, the brake servo unit 6 is correspondingly pivoted upwards. Consequently, the brake pedal 7 is pivoted downwards and thus out of the footwell 5.

The compound bearing 12b can be configured in a simple manner as a guide pin which is retained in a fork-shaped front projection of the articulated pillar 11b. From a particular pivot angle, the pin of the compound bearing 12b releases itself from the forked projection of the articulated pillar 11b as seen in FIG. 10, so that further deformations of the front-end structure can no longer cause any disadvantageous backward displacements of the brake servo unit 6. This pivot movement of the brake servo unit 6 is intensified if the upper flange of the side member 2b additionally undergoes deformation in the vertical direction of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A front-end structure for a motor vehicle having a front wall which separates a passenger compartment from a front-end compartment and on which a brake servo unit is fixed, to which is connected a brake pedal extending into a footwell of the passenger compartment, comprising front-end body-shell parts and a front end region of the brake servo unit, in a direction of travel, is assigned at least one mechanical forced guidance device, which is fixed on at least one of the body-shell parts such that, in the event of a vehicle impact, the device engages with at least one movement component in a vertical vehicle direction, from bottom to top, on the front end region of the brake servo unit to generate a tilting movement of the brake servo unit.

2. The front-end structure according to claim 1, wherein the at least one forced guidance device is associated with the front end region of the brake servo unit so that, in a backward displacement in a longitudinal vehicle direction during impact deformation, the device is uncoupled from the brake servo unit.

3. The front-end structure according to claim 1, wherein the device is a supporting arm arranged on the at least one bodyshell part such that, during a front-end deformation, the arm presses at least intermittently with positive fitting against an engagement point of the brake servo unit.

4. The front-end structure according to claim 3, wherein the engagement point is formed by a supporting member on a housing of a brake master cylinder of the brake servo unit, which engagement point is positioned on the housing such that the supporting arm, in a movement component of the front-end deformation in a longitudinal vehicle direction, slides down backwards on the supporting member without applying a torque to the brake servo unit.

5. The front-end structure according to claim 1, wherein the mechanical forced guidance device is a supporting arm provided with a pre-planned bending point preventing a torque on the brake servo unit contrary to the generated tilting movement.

6. The front-end structure according to claim 1, wherein the mechanical forced guidance device is a supporting arm articulated on an engagement point of a brake booster unit of the brake servo unit by an uncoupling mechanism arranged to effect a release of the supporting arm from the engagement point in the event of the initiation of torque on the brake servo unit back towards the footwell.

* * * * *